P. A. REICHERT.
ANIMAL TETHERS.
No. 184,663.  Patented Nov. 21, 1876.
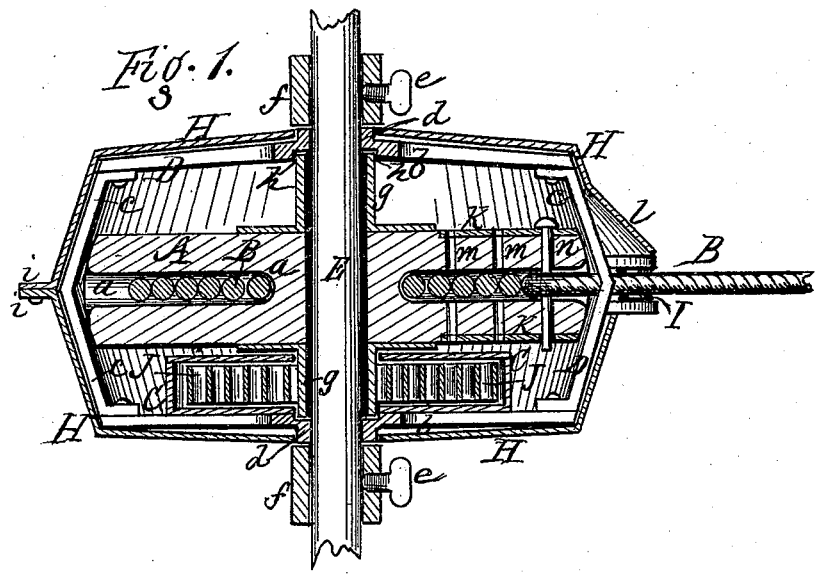
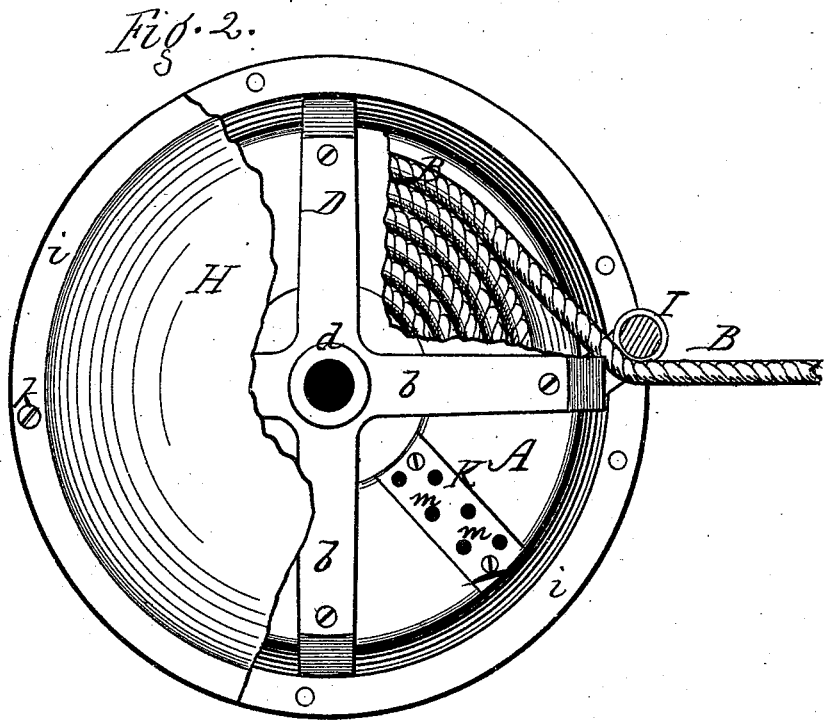
Witnesses.
E. B. Scott
Louis D. Spahn
Inventor.
Peter A. Reichert
pr. R. F. Osgood
Atty.

UNITED STATES PATENT OFFICE.

PETER A. REICHERT, OF ROCHESTER, NEW YORK.

IMPROVEMENT IN ANIMAL-TETHERS.

Specification forming part of Letters Patent No. 184,663, dated November 21, 1876; application filed March 21, 1876.

*To all whom it may concern:*

Be it known that I, PETER A. REICHERT, of the city of Rochester, in the county of Monroe and State of New York, have invented a certain new and useful Improvement in Animal-Tethers; and I do hereby declare that the following is a full, clear, and exact description of the construction and operation of the same, reference being had to the accompanying drawings, in which—

Figure 1 is a central vertical section. Fig. 2 is a plan, with parts broken away to show the interior arrangement.

My improvement relates to tethers in which a spring-drum is used to pay out and take up the rope, and thereby prevent entanglement of the animal.

The invention consists in the construction and arrangement of the spring-drum and other connecting parts, as hereinafter more fully described.

A represents the drum, which is operated by a coiled spring, J. This is situated in a case, C, at the bottom, as shown in Fig. 1. The drum is preferably made of wood, but may be made of sheet or cast metal. It is cut with a deep, narrow groove, $a$, of only such width as to allow the entrance of the rope B, winding one layer over another in a single coil, as shown in Fig. 1. By this means I can make the drum very thin, and yet get sufficient space to allow the winding of the necessary length of rope. This method of laying the rope insures better winding and unwinding than where the rope is coiled on a wide pulley, with the coils overlying each other irregularly, and there is less danger of catching.

D is a skeleton frame, of cast-iron, consisting of upper and lower spiders $b\ b$, connected at the extremities by short arms $c\ c$, bolted to the same and inclosing the drum A. At the top and bottom the spiders have hubs $d\ d$, which rest and turn closely upon the bar E. This bar is anchored in the ground at any convenient position, and the hubs $d\ d$ are retained against slipping up or down by loose collars $f\ f$, resting on the bar, secured by set-screws $e\ e$. This allows the device free turning movement, but prevents detachment.

Instead of a long anchor-bar, a short one may be used, secured to a wooden post or stake.

$g\ g$ are two short boxes, attached to the drum A, which rest and turn in countersunk sockets $h\ h$ of the exterior hubs $d\ d$. This allows free rotation of the drum without coming in contact with the bar, and also allows free rotation of the interior frame surrounding the drum without disturbing the latter. Both movements are therefore independent. Therefore, the exterior frame can turn freely, to allow the rope to follow the animal, and the interior drum can turn freely within the frame, to wind up or pay out the rope.

H H are two counterparts, forming the case. They are preferably of sheet metal, but may be of cast-iron or wood. They meet at the center, where their flanges $i\ i$ are fastened together by screws $k\ k$. The lower flange, where the screws enter, are re-enforced by extra thicknesses of the metal, so as to form a secure hold for the screws. The object is to cover the attachment and protect it from rain, and also prevent violence to the same by the animal.

I is a pulley and eye on one side, attached to the frame, through which passes the end of the rope. The pulley is covered and protected by a lip, $l$, of the upper half of the case H.

K K are plates, attached to the top and bottom of the drum A, in coincident positions. Through these and the drum is made a series of holes, $m\ m$. Through these holes passes a pin, $n$. The holes are in line with the various coils of the rope in the groove of the drum. The object of this arrangement is to gage or limit the paying out of the rope when it is desired to use less than the whole length of the rope. This is done by inserting the pin $n$ through one of the holes $m$ at any position, according to the length of the rope to be paid out, in which case, when the rope is uncoiled up to the pin, the latter, coming in conjunction with the pulley I, forms a stop to the rope, and prevents the balance of the rope from being drawn out. This is convenient for limiting the range of various animals, or for preventing them from reaching trees, shrubs, or beds. The length of range can be adjusted exactly as desired. In winding up, the rope winds closely over the pin without producing undue projection of the coils in the groove.

The tension of the spring can be increased or diminished at pleasure. To increase it, draw out the rope the required distance to increase the tension, hold the drum from turning, and then coil the loose end of the rope around the drum till the slack is taken up. To lessen the tension, uncoil the rope from the drum to the degree desired.

This invention presents the following advantages: The construction of the drum with the single deep narrow groove allows the drum to be made very thin, and insures better coiling and uncoiling of the rope, and lessens the danger of catching or binding, as before described. The plates K K, with the holes $m\ m$, enable the paying out of the rope to be gaged exactly as desired. The construction of the device with the exterior hubs $d\ d$ and interior boxes $g\ g$ enables the outer frame and the interior drum to move independently without friction. The half-cases H H inclose the attachment and prevent violence, and are of also such shape as to shed water, thereby keeping the interior tight.

What I claim as new is—

1. In an animal-tether, the combination, with the spring-drum A, provided with the narrow groove $a$, of the plates K K, on opposite sides of the drum, provided with the holes $m\ m$, extending through the drum, whereby a pin may be inserted through between any of the coils of rope in the groove, to gage the unwinding of the rope, as and for the purpose specified.

2. In an animal-tether, the combination of an exterior frame or holder, D, turning freely upon the supporting bar or anchor to follow the circuit of the animal, and an interior drum or pulley, A, having its bearings in the hubs of the exterior frame, and turning freely, to allow the paying out or taking up of the rope, as shown and described, and for the purpose specified.

3. The combination, with the exterior frame or holder D and interior drum or pulley A, each having an independent movement, of the offset sockets $h\ h$ formed in the hubs of the outer frame, and the bearings $g\ g$ of the drum resting in said sockets, whereby the drum may revolve without coming in contact with the supporting bar or anchor, as shown and described, and for the purpose specified.

In witness whereof I have hereunto signed my name in the presence of two subscribing witnesses.

PETER A. REICHERT.

Witnesses:
R. F. OSGOOD,
E. B. SCOTT.